United States Patent
Mellor et al.

(10) Patent No.: US 8,827,820 B1
(45) Date of Patent: Sep. 9, 2014

(54) FLEXIBLE SHAFT WITH INTERFERENCE FIT CAPABILITY

(71) Applicants: Paul Michael Mellor, Easton, PA (US); Tat M. Yuen, Old Bridge, NJ (US)

(72) Inventors: Paul Michael Mellor, Easton, PA (US); Tat M. Yuen, Old Bridge, NJ (US)

(73) Assignee: S.S. White Technologies Inc., Piscataway, NJ (US)

( * ) Notice: Subject to any disclaimer, the term of this patent is extended or adjusted under 35 U.S.C. 154(b) by 0 days.

(21) Appl. No.: 13/873,314

(22) Filed: Apr. 30, 2013

Related U.S. Application Data

(60) Provisional application No. 61/803,125, filed on Mar. 19, 2013.

(51) Int. Cl.
*F16C 1/06* (2006.01)
*F16C 1/02* (2006.01)
(52) U.S. Cl.
CPC ........................................ *F16C 1/02* (2013.01)
USPC .............................................. 464/58; 464/60
(58) Field of Classification Search
CPC ................................ F16C 1/20; F16D 41/206
USPC ...................................... 464/57–60; 74/502.5
See application file for complete search history.

(56) References Cited

U.S. PATENT DOCUMENTS

| | | | |
|---|---|---|---|
| 3,389,579 A | 6/1968 | Werner et al. | |
| 4,411,168 A | 10/1983 | Yoshifuji | |
| 4,849,038 A | 7/1989 | Burghardt et al. | |
| 5,913,944 A * | 6/1999 | Haynes et al. | |
| 7,717,795 B2 | 5/2010 | Mellor | |
| 8,671,816 B2 * | 3/2014 | Yanagita | |

FOREIGN PATENT DOCUMENTS

| | | |
|---|---|---|
| EP | EP 1286065 B1 | 2/2012 |
| WO | WO 2011/037070 A1 * | 3/2011 |

OTHER PUBLICATIONS

Barnet Nylon 6 Yarn for Industrial applications [online] [retrieved on Apr. 9, 2014]. Retrieved from the Internet: <htto://www.barnet-europe.com/en/yarns>.*

* cited by examiner

*Primary Examiner* — Gregory Binda
(74) *Attorney, Agent, or Firm* — Arthur L. Lessler

(57) ABSTRACT

A flexible shaft for transmitting torque, for example between a motor and an automobile seat to be adjusted. The shaft has a core including one or more wire layers helically wound in opposite winding directions. The outer layer has a number of wires with a circular cross-section and at least one flat wire. The wires of the outer layer are helically wound in a winding direction opposite to that of the adjacent layer. The flat wire has a thickness substantially less than the maximum diameter of the outer layer wires of circular cross-section. A strand of flocked yarn is wound on the flat wire and protrudes above the adjacent wires of the outer layer, to engage the inner wall of a surrounding casing and reduce noise when the shaft is rotated within the casing.

11 Claims, 3 Drawing Sheets

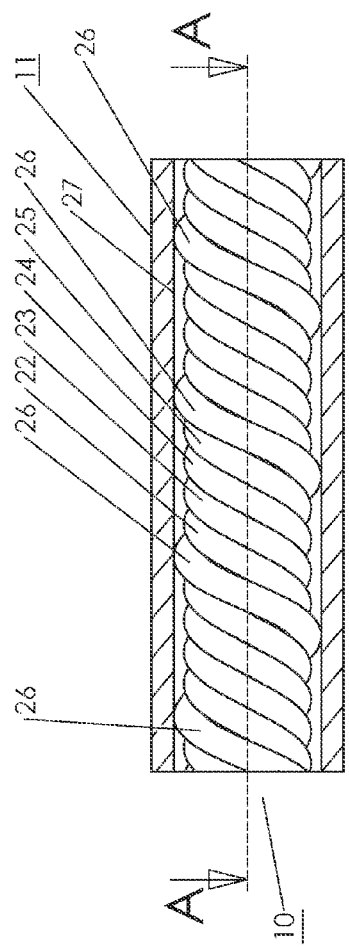
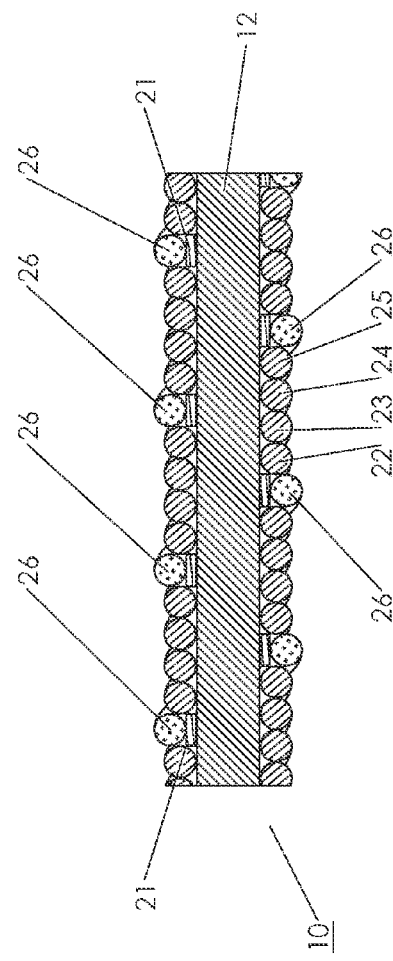

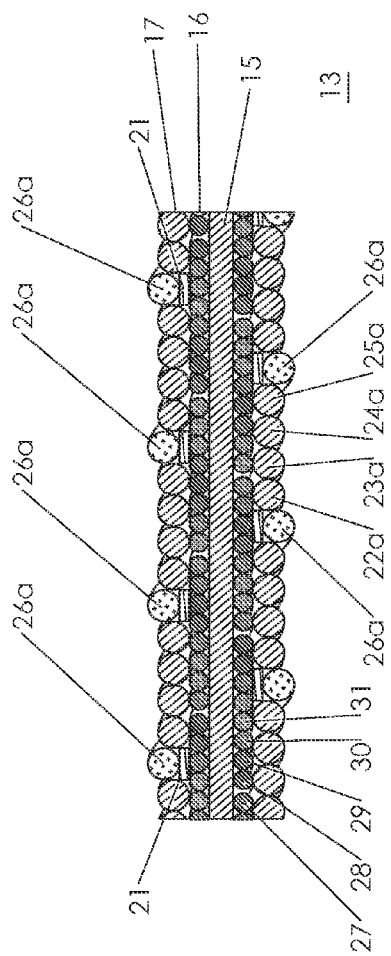
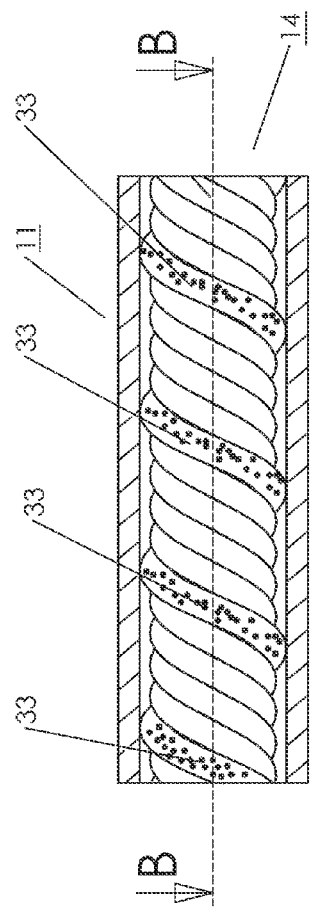

FLEXIBLE SHAFT WITH INTERFERENCE FIT CAPABILITY

CROSS-REFERENCE TO RELATED APPLICATION

This application claims the benefit of U.S. Provisional Application Ser. No. 61/803,125 filed Mar. 19, 2013 and entitled Flexible Shaft With Interference Fit Capability.

BACKGROUND OF THE INVENTION

The present invention relates to a rotating flexible shaft having tips or ends adapted to engage mating elements of driving or driven members; and more particularly to a flexible shaft having a wire wound outer layer.

Rotary shafts for transmitting torque typically have square ends adapted to engage square recesses of mating driving and driven parts. Rotary flexible shafts commonly used to transmit torque from a motor to adjust a seat in a motor vehicle, for example, are disposed within cylindrical casings which eliminate buckling and isolate the rotating shaft from contact with adjacent structures.

For "perceived quality" reasons, especially in consumer products, it is desirable to reduce noise due to rattle between the rotating shaft and the surrounding casing and/or the driving and driven components to the greatest extent practicable. For this purpose it is known to replace one of the wires in the outer wire wound layer of the flexible shaft with a cord, strand or thread of relatively soft material (compared to that of the casing) such as flocked yarn. The terms cord, strand and thread are used interchangeably herein.

Eichenberger et al. European Patent EP 1286065 discloses such a shaft, in which a wire of the outer layer is omitted to leave a gap, and flocked yarn having a diameter greater than that of the outer layer wires is wound into the gap; so that the yarn contacts the inner wall of the casing and isolates the wires from the wall, thus reducing noise when the shaft is rotated.

However, omission of an outer layer wire in Eichenberger et al. reduces the consistency of pitch of the outer layer and allows the gap in which the yarn is disposed to vary in width as the shaft is manufactured and processed, thus diminishing the consistency of the protrusion of the flocked yarn. Omitting a wire also reduces the useful life of the shaft.

In U.S. Pat. No. 3,389,579 to Werner et al. entitled Shaft Guided In A Protection Tube, noise isolation between a flexible shaft and a surrounding protection tube is provided by adhering short elastic fibers to the outer surface of the shaft or the inner surface of the protection tube, to form a brush-like layer between the shaft and tube.

In U.S. Pat. No. 4,411,168 to Yoshifuji entitled Inner Cable, noise due to contact between a push-pull wire wound flexible cable and a surrounding conduit is reduced by winding a hollow elastic member on the cable core between wire teeth also wound on the core, the elastic member having a greater diameter than the teeth so that only the elastic member contacts the inner surface of the conduit, thus reducing noise when the cable is moved longitudinally.

In U.S. Pat. No. 4,849,038 to Burghardt entitled Method For Depositing An Interlining On A Pitched Cable For Reducing Friction And Noise, a filament flocked with abrasion resistant material is wound or deposited on a wire wound flexible shaft, interleaved with the wire of the outer layer of the shaft.

In U.S. Pat. No. 7,717,795 to Mellor, a deformable polytetrafluoroethylene sheath is applied over the ends of a flexible shaft to reduce noise and vibration due to friction and relative movement between the shaft ends and mating recesses.

Accordingly, an object of the present invention is to provide a rotary flexible shaft that exhibits low rotational noise when coupled between driving and driven members and disposed within a surrounding casing.

SUMMARY OF THE INVENTION

A flexible shaft which serves to transmit torque has a core and at least one layer thereon. The outer layer has a number of wires including at least one wire having a noncircular cross-section, the wires being helically wound in a first winding direction. The maximum thickness of said wire of noncircular cross-section is substantially less than the maximum diameter of the other outer layer wires. A strand of resilient compressible material is wound on the wire of noncircular cross-section and protrudes above the adjacent portions of the outer layer.

By engaging the inner wall of a surrounding casing, and/or of the driving and driven components, the protruding parts of the resilient compressible material reduce noise when the shaft is rotated.

IN THE DRAWING

FIG. 1 is a side elevation view of a rotary flexible shaft according to the invention, disposed within a casing, showing the casing in cross-section.

FIG. 2 is a side cross-sectional view of the shaft shown in FIG. 1 according to a first embodiment of the invention, taken along the cutting plane A-A of FIG. 1.

FIG. 3 is a side cross-sectional view of the shaft shown in FIG. 1 according to a second and preferred embodiment of the invention, taken along the cutting plane A-A of FIG. 1.

FIG. 4 is a side elevation view of a rotary flexible shaft according to a third embodiment of the invention, disposed within a casing, showing the casing in cross-section.

DETAILED DESCRIPTION

Figure 5:
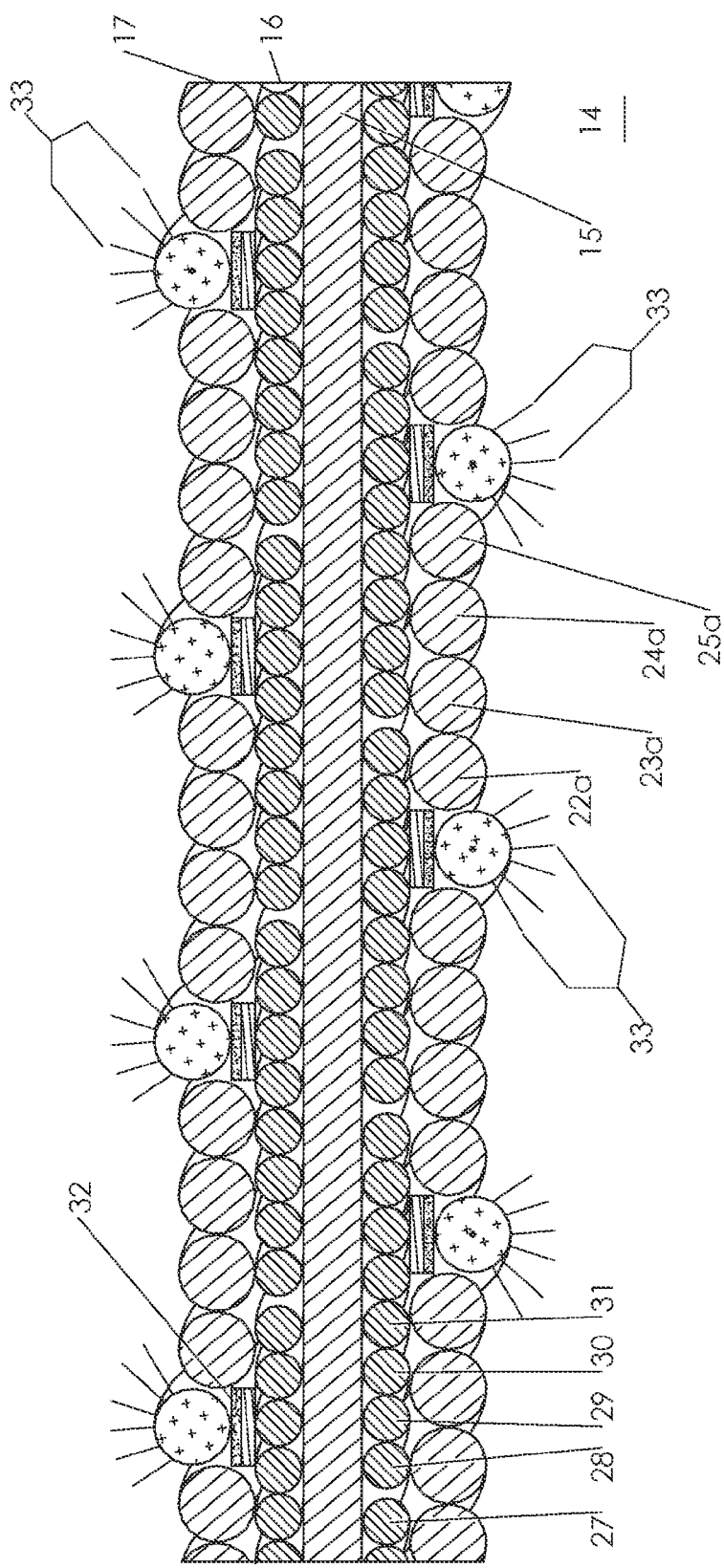
FIG. 5 is a side cross-sectional view of the shaft shown in FIG. 4, taken along the cutting plane B-B of FIG. 4.

As shown in FIGS. 1 and 2, the flexible shaft 10 is disposed within a cylindrical casing 11 having an inner wall 27 which closely surrounds the shaft.

The shaft 10 has a core which is a single wire 12 as shown in FIG. 2; while the shafts 13 and 14 shown in FIGS. 3 and 5 respectively each have a core comprising one wire layer 16 helically wound on a single central wire 15 in a first winding direction, with a second wire layer 17 helically wound on the core in a second winding direction opposite to the first winding direction.

The flexible shafts shown in FIGS. 2 and 3 have the external appearance shown in FIG. 1, while the shaft shown in FIG. 5 has the external appearance shown in FIG. 4.

Each of the layers shown in FIGS. 1 through 5 consists of five wires. Each of the outer layers has four wires of circular cross-section and one flat wire which has a thickness substantially less than the diameter or thickness (these terms are used interchangeably here) of the circular wires.

As shown in FIGS. 1 and 2, the outer layer of the shaft 10 has wires 21 through 25 helically wound on the core 12 in a first winding direction. Wire 21 is flat and has a thickness substantially less than the thickness (or diameter) of wires 22 through 25.

A strand 26 of resilient compressible material such as flocked yarn is helically wound on the flat wire 21.

The strand 26 has a diameter or thickness which is such that the strand protrudes beyond the outer surfaces of the wires 22 through 25, so that when the shaft 10 is disposed within the closely surrounding casing 11 and rotated within the casing, the strand 26 engages the inner wall 27 of the casing 11 and acts as a buffer to reduce contact between the outer layer of the shaft 10 and the casing inner wall; thus reducing noise.

While flocked yarn is preferred for the strand 26, other resilient compressible materials may be used, such as soft monofilament material, or suitable forms of flexible resilient thermoplastic or thermosetting polymers.

Flexible shafts are frequently formed with square ends to facilitate engagement between driving and driven members. The ends may be formed, for example, by swaging the shaft. Since the strand 26 is flexible and resilient, it will extend beyond the adjacent wires of the shaft outer layer at the ends after the swaging process, so that the strand at the shaft ends will provide reduction of noise due to movement between the shaft ends and mating recesses at the driving and driven ends when the shaft is rotated.

Instead of flocked yarn, the strand 26 may be formed by applying a suitable polymer in liquid form to the flat wire 21, and causing the polymer to cure.

The width of the flat wire 21 is preferably slightly greater than the diameter of the adjacent wires and is selected to accommodate a strand 26 of desired size. Thus the wire 21 acts as a spacer to insure uniform width of the space into which the strand is wound, and prevent undesirable shifting of wires in the outer layer which could otherwise occur if the wire 21 were to be omitted as taught by the aforementioned Eichenberger patent.

The wire 21 may be extruded from a wire of circular cross-section, and for that purpose the wire preferably comprises a ductile material such as aluminum or copper. It may alternatively comprise steel, metal alloys, or a flexible plastic.

The flexible shaft 13 (FIG. 3) is similar to the shaft 10, except that the core is not a single wire, but has a layer of wires 27 through 31 helically wound thereon, in a winding circular wires 22a, 23a, 24a, 25a, and flat wire 26a.

Instead of a strand 26 (FIGS. 1 and 2) or 26a (FIG. 3), as shown in FIG. 5 the flat wire may be coated with a layer 32 of glue and a relatively large number of fibers 33 may be embedded in the glue using an electrostatic or other suitable process, so that the fibers protrude beyond the outer layer of the flexible shaft 14 to engage the inner wall 27 of the casing 11, to reduce noise in the same manner as the strand 26.

While a flat wire is preferred for receiving the strand 26 or glue and fibers 32 and 33, alternatively that wire may have a different shape, such as a concave upper surface for helping to receive and contain the glue in the embodiment shown in FIGS. 4 and 5.

We claim:

1. A flexible shaft having an outer layer, for transmitting torque, said shaft having a core and at least one layer thereon,
    the outer layer comprising a plurality of wires including at least one spacer wire having a noncircular cross-section, said wires being helically wound in a first winding direction, a majority of the wires in said outer layer having a circular cross-section,
        the maximum thickness of said spacer wire being substantially less than the maximum diameter of the wires of circular cross-section in said outer layer; and
    a strand of resilient compressible material wound on said spacer wire,
        said strand protruding above the adjacent portions of said outer layer, said spacer wire acting as a spacer to insure uniform width of the space into which the strand is wound.

2. The flexible shaft according to claim 1, wherein said core comprises an inner layer of wires helically wound in a second winding direction opposite to the first winding direction.

3. The flexible shaft according to claim 1 or 2, wherein said spacer wire is substantially flat.

4. The flexible shaft according to claim 1 or 2, wherein said strand comprises flocked yarn.

5. The flexible shaft according to claim 1 or 2, wherein said strand comprises a thermoplastic or thermosetting material.

6. A flexible shaft having an outer layer, for transmitting torque, said shaft having a core and at least one layer thereon,
    the outer layer comprising a plurality of wires having a circular cross-section and at least one spacer wire having a noncircular cross-section, said wires being helically wound in a first winding direction,
        the maximum thickness of said spacer wire being substantially less than the maximum diameter of said outer layer wires of circular cross-section;
    a layer of glue on said spacer wire; and
    a multiplicity of resilient fibers adhering to said glue layer, said fibers protruding above the adjacent portions of said outer layer,
    said spacer wire acting as a spacer to insure uniform width of the space in which the glue is disposed.

7. A flexible shaft having an outer layer, for transmitting torque, said shaft having a core and at least one layer thereon,
    the outer layer comprising a plurality of wires having a circular cross-section and at least one metal spacer wire having a noncircular cross-section, said wires being helically wound in a first winding direction,
        said spacer wire being substantially flat with a thickness substantially less than the maximum diameter of said outer layer wires of circular cross-section; and
    a strand of flocked yarn wound on said spacer wire,
        said strand protruding above the adjacent portions of said outer layer, said spacer wire acting as a spacer to insure uniform width of the space into which the strand is wound.

8. In combination,
    a flexible shaft having an outer layer, for transmitting torque, said shaft having a core and at least one layer thereon,
    the outer layer comprising a plurality of metal wires, including at least one spacer wire having a noncircular cross-section, said wires being helically wound in a first winding direction, a majority of the wires in said outer layer having a circular cross-section,
        the maximum thickness of said spacer wire being less than the maximum diameter of the wires of said outer layer having a circular cross-section; and
    a strand of resilient compressible material wound on said wire of noncircular cross-section,
        said strand protruding above the adjacent portions of said outer layer; and
    a casing surrounding said shaft and having an inner wall in contact with at least a portion of the outer surface of said strand;
    whereby said strand engages said inner wall to reduce rattle between the inner wall and the outer layer of the shaft, thus reducing noise when the shaft is rotated within the casing, said spacer wire acting as a spacer to insure uniform width of the space into which the strand is wound.

9. The combination according to claim 8, wherein said spacer wire is substantially flat.

10. The flexible shaft according to claim 8 or 9, wherein said strand comprises flocked yarn.

11. The flexible shaft according to claim 8 or 9, wherein said strand comprises a thermoplastic or thermosetting material.

\* \* \* \* \*